(12) United States Patent
Ratiu et al.

(10) Patent No.: US 7,956,767 B2
(45) Date of Patent: Jun. 7, 2011

(54) AUTOMATIC METER READING COMMUNICATION

(75) Inventors: Ovidiu Ratiu, Marietta, GA (US); Marius Ovidiu Chilom, Mableton, GA (US)

(73) Assignee: Nivis, LLC, Atlanta, GA (US)

( * ) Notice: Subject to any disclaimer, the term of this patent is extended or adjusted under 35 U.S.C. 154(b) by 883 days.

(21) Appl. No.: 11/765,804

(22) Filed: Jun. 20, 2007

(65) Prior Publication Data

US 2008/0117077 A1    May 22, 2008

Related U.S. Application Data

(60) Provisional application No. 60/815,156, filed on Jun. 20, 2006.

(51) Int. Cl.
*G08B 23/00* (2006.01)
(52) U.S. Cl. .............. 340/870.02; 340/870.12; 340/288; 340/310.11
(58) Field of Classification Search ......... 340/870.02–870.03, 870.12
See application file for complete search history.

(56) References Cited

U.S. PATENT DOCUMENTS

| | | | | |
|---|---|---|---|---|
| 5,719,564 A | * | 2/1998 | Sears | 340/870.02 |
| 6,100,817 A | * | 8/2000 | Mason et al. | 340/870.02 |
| 7,231,482 B2 | * | 6/2007 | Leach | 710/305 |
| 7,277,027 B2 | * | 10/2007 | Ehrke et al. | 340/870.12 |
| 7,317,404 B2 | * | 1/2008 | Cumeralto et al. | 340/870.02 |
| 7,432,823 B2 | * | 10/2008 | Soni | 340/870.02 |
| 7,436,321 B2 | * | 10/2008 | White et al. | 340/870.02 |

* cited by examiner

*Primary Examiner* — Albert K Wong
(74) *Attorney, Agent, or Firm* — Kilpatrick Townsend & Stockton LLP (57) ABSTRACT

An automatic consumption meter reading system utilizing a radio frequency network and a power line carrier network is provided. The radio frequency (RF) network and the power line carrier (PLC) network are communicatively linked with a radio frequency to power line communication bridge device. The radio frequency to power line communication bridge device is communicatively linked to a consumption meter. An automatic meter reading device includes an RF modem and a PLC modem and transmits and receives data to and from a consumption meter using the RF and PLC modems.

3 Claims, 8 Drawing Sheets

FIG. 8

AUTOMATIC METER READING COMMUNICATION

CROSS-REFERENCE TO RELATED APPLICATION

This application claims priority to copending U.S. provisional application entitled, "RF/PLC AMR SYSTEM," having Ser. No. 60/815,156, filed Jun. 20, 2006, which is entirely incorporated herein by reference.

TECHNICAL FIELD

This disclosure relates to data communications, and more particularly to a means of interconnection between different networks.

BACKGROUND

The monitoring and controlling of devices located remotely from a central location has historically provided many challenges. The ability to detect a condition at a remotely located position or to exercise control over a system (such as turning a device off and on) from a central location has oftentimes been limited by the distance of the central control location from the device that is monitored or controlled. For example, monitoring and controlling devices within a manufacturing facility or a power plant may be accomplished by hardwiring the sensors and controllers with monitors and controllers in the central control room that may be only a few hundred feet away. However, hardwired monitoring and controlling of devices in areas wherein the remotely located sensors and controllers are positioned miles away from the central control area instead of feet becomes impractical due to the inability to communicate electrical control signals between the central control room and the remotely located sensor or controller.

DESCRIPTION OF THE DRAWINGS

Many aspects of the disclosure may be better understood with reference to the following drawings. The components in the drawings are not necessarily to scale, emphasis instead being placed upon clearly illustrating the principals of the present disclosure. Moreover, in the drawings, like reference numerals designate corresponding parts throughout the several views.

DETAILED DESCRIPTION

In addition to the drawings discussed above, this description describes one or more embodiments as illustrated in the above-referenced drawings. However, there is no intent to limit this disclosure to a single embodiment or embodiments that are disclosed herein. On the contrary, the intent is to cover all alternatives, modifications, and equivalents included within the spirit and scope of this disclosure and as defined by the appended claims.

Utility meters for electricity, gas and water located at residential homes dispersed in a geographical area have historically collected data locally. But to collect that data, utility personnel have previously physically traveled to each utility meter throughout the geographic dispersal of meters to physically read the data for these meters.

However, in recent years, efforts have been made to develop automatic meter reading systems for utility meters such as electricity, gas and water meters that avoid employing meter reading personnel to physically inspect each individual meter within the geographic area of meters. Some such systems incorporate low-powered RF transceivers in the meters that broadcast system information, such as consumption data. Thus, the broadcast area may be such that meter reading personnel may drive near the location of the individual meter to collect any data stored in the meter. As a nonlimiting example, meter reading personnel may drive along a street of houses with meters equipped with such RF transceivers that communicate with transceivers in the personnel's vehicle. The mobile transceivers collect and store consumption information and other data received from the broadcasting utility meters.

However, a problem with this configuration is that data may be collected from an individual meter in the geographic area of meters when the utility personnel comes within the broadcast range of the individual meters at each location. While this is an improvement over utility personnel having to physically inspect and read each individual meter, this configuration relies on a human for data collection. Stated another way, the data collection process retains at least one manual step.

In an effort to move meter reading to a completely automated process, several approaches have been advanced. One proposal involves an arrangement in which communication with electric meters, for example, is carried out using the power transmission line coupled to an individual residence or commercial location. In this nonlimiting example, communication takes place across a power line, and the central location polls the remotely located meter periodically. However, difficulties in transmitting the data across the same line that carries high voltage electricity has encountered many difficulties, thereby making this approach less practical. Plus, in this nonlimiting example, other types of meters, such as water and gas meters, are not coupled to the network, due to the fact that these are separate systems.

Additional attempts have included installing modems and other communication devices in the remotely located meters that couple to phone lines and other communication links in the residence or commercial location. Such a modem may connect to the homeowner's telephone line to periodically communicate usage data and other information over a publicly switched telephone network to a modem at a central monitoring and control location. However, this proposal involves other parties, such as a telephone company, for implementing the system. Additionally, this method suffers from a lack of priority. For example, when the homeowner is using the telephone line, the modem in the meter cannot acquisition the line. Requiring utility consumers to procure second telephone lines for meter communication is impracticable and reliance on other parties is required.

Various types of wireless proposals have been advanced as solutions to this problem. One such proposal involves providing each utility meter with the capability of wirelessly communicating with other utility meters within a predetermined communication range. However, these wireless communication proposals may sometimes suffer from several drawbacks and inabilities. For example, while a number of meters may communicate with each other due to the relative proximity of their respective locations, getting the data back to the central monitoring and control location has proven to be an obstacle. Solutions have included locating a portal or other type of data gathering device near each individual meter and communicating data back to the central monitoring and control location. This limitation has previously meant that a data gathering device is typically located within the short communication range of each wireless transceiver, or that separate repeaters must be used to repeat the data from the remotely located meters to the portals so that each meter may communicate its data up the chain to the central location.

These types of solutions have also been plagued by communication problems, including bottlenecks and breakdowns in the chain. Battery and memory concerns render some remotely located meters inaccessible, thereby resulting in a system where all meters within a given geographical area cannot be included in the communication network.

Consequently, the inability to network the various geographically distributed meters into an integrated system wherein data may be monitored and also controlled from a central location has caused some of the inferior solutions discussed above to be implemented, such as leading to meter reading personnel to drive through areas where meters are equipped with limited broadcast capabilities. Moreover, the prohibitive costs associated with installing a great number of portals and/or repeaters in an area so that networking each individual utility meter may be a costly approach.

Figure 1:
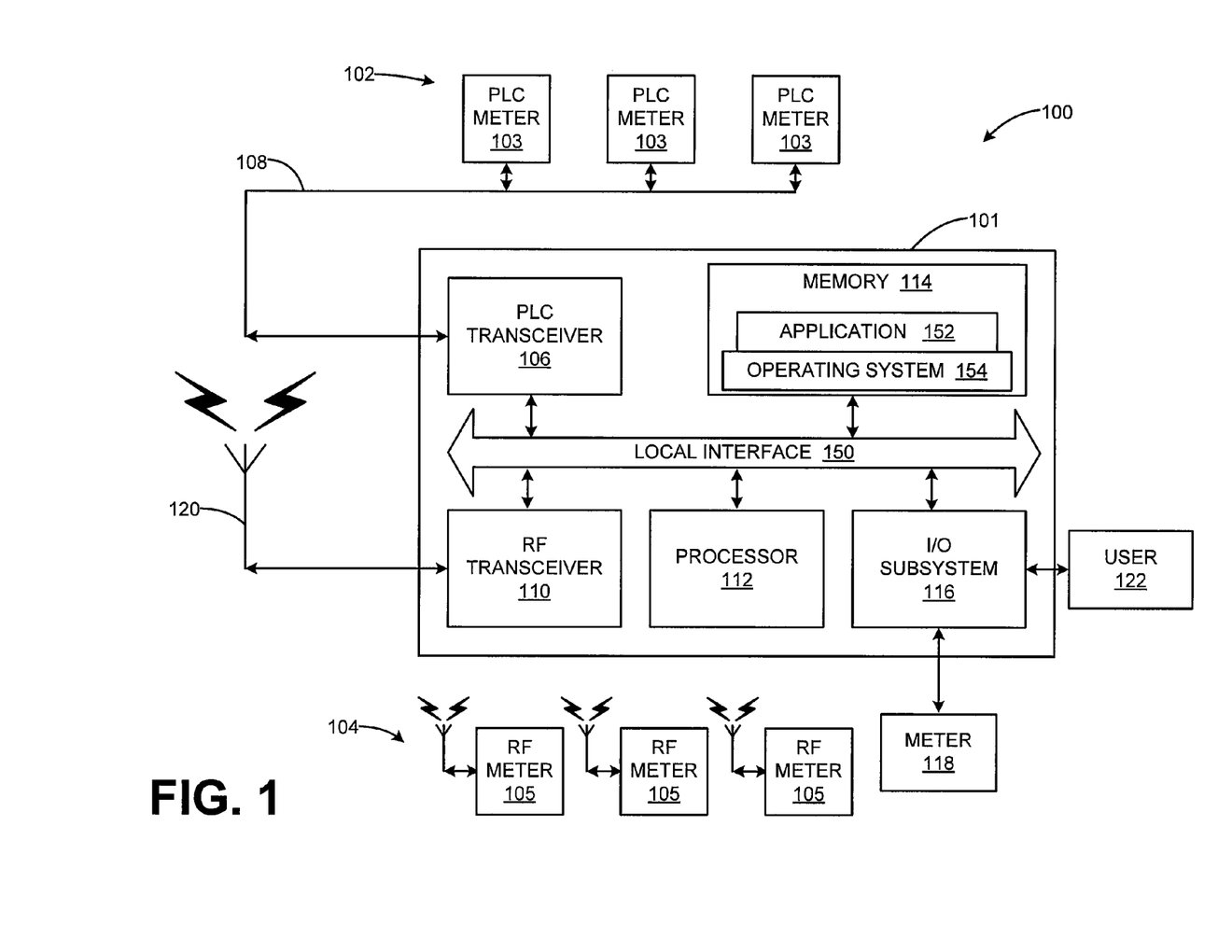
FIG. 1 provides an example embodiment of an automatic meter reading (AMR) system with a radio frequency (RF) and a power line communication (PLC) capable device.

FIG. 1 provides system 100, a nonlimiting example embodiment of an automatic meter reading (AMR) interface with a radio frequency (RF) and power line communication (PLC) capable device. System 100 includes PLC network 102, RF network 104, and AMR interface with RF and PLC capability device (AMR Interface Device) 101. The PLC network 102 includes a plurality of PLC meters 103 communicatively linked to a power line 108. RF network 104 includes a plurality of RF meters 105 communicatively linked via radio frequency to antenna 120.

In a nonlimiting example embodiment, AMR interface device 101 may include PLC transceiver 106, which may be configured to provide connectivity to PLC network 102 via power line 108. AMR interface device 101 may also include RF transceiver 110 connected to antenna 120. PLC transceiver 106 and RF transceiver 110 may both be coupled to processor 112 via local interface 150. PLC transceiver 106 and RF transceiver 110 may send and receive data to and from PLC network 102 and RF network 104, respectively.

Processor 112 may communicate by local interface 150 with memory 114, which may include operating system 154 and application specific software 152. Processor 112 may also interface with metering device 118. Processor 112 may also use RF transceiver 110 and PLC transceiver 106 to transmit data and control signals received from consumption meter 118 to RF network 104 and PLC network 102. Thus, processor 112 utilizing memory 114 and an input/output subsystem 116 may send and receive data and control signals to and from PLC network 102 and RF network 104 and consolidate data for delivery to consumption meter 118.

This connectivity allows user 122 to receive meter data, and to control the meters in RF network 104 and PLC network 102 by sending and receiving control data and instructions via input/output subsystem 116. Alternatively, system 100 may be controlled automatically by a programmed computer processor in a remote location (not shown).

Note that the example embodiment shown in FIG. 1 does not limit the composition of PLC network 102 or RF network 104. The networks may also include meters or bi-directional control/metering devices for utilities including, but not limited to, electricity, gas, and water utilities, load control devices, and display devices.

Figure 2:
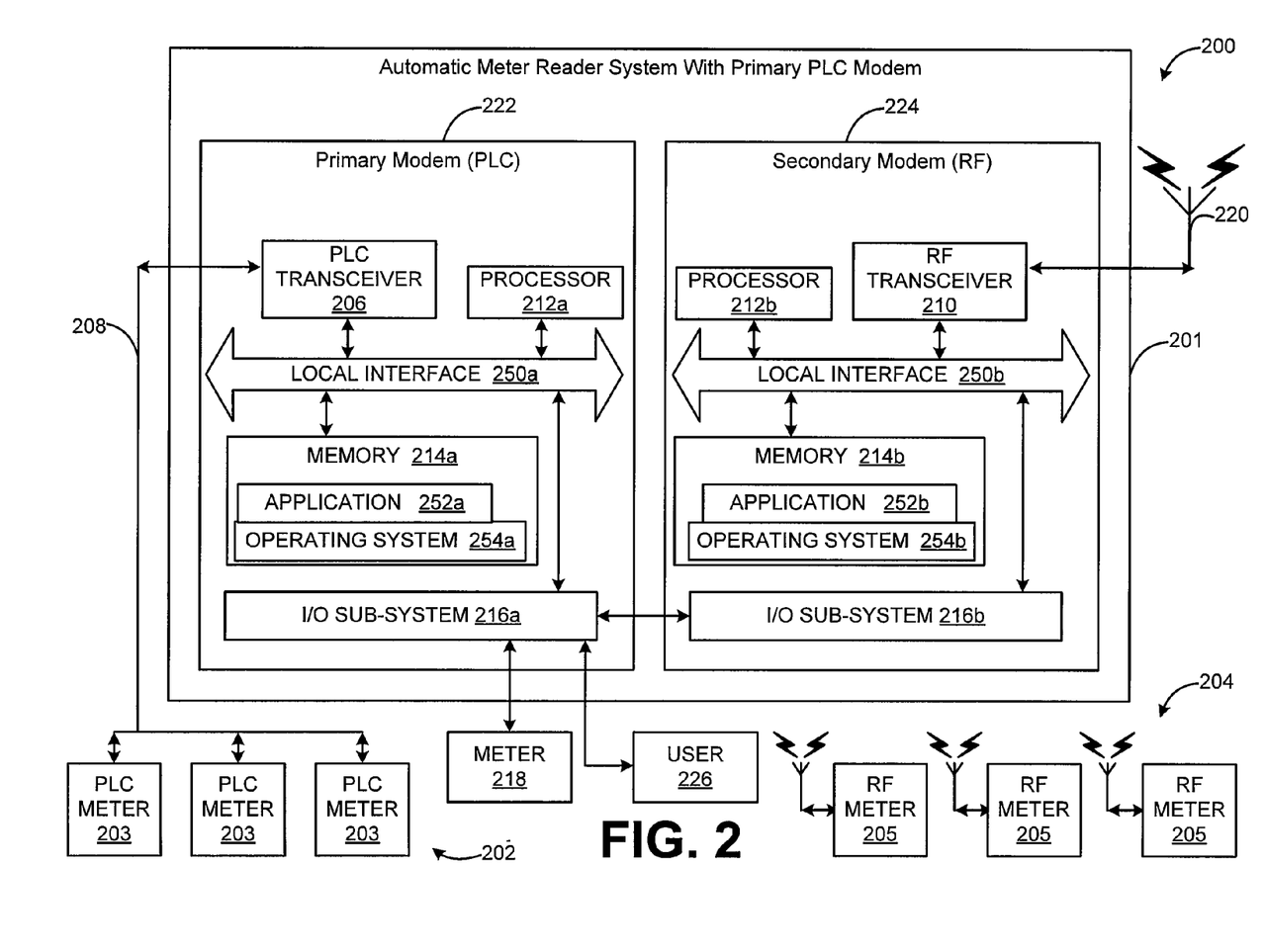
FIG. 2 provides the example embodiment AMR system of FIG. 1 with an AMR interface device having a primary PLC modem and a secondary RF modem.

FIG. 2 demonstrates an alternate implementation of system 200, which includes AMR interface device 201, as similarly shown in FIG. 1. In FIG. 2, AMR interface device 201 includes primary modem 222 and secondary modem 224. Primary modem 222 is a PLC modem that includes PLC transceiver 206, processor 212a, local interface 250a, memory 214a, and primary input/output subsystem 216a. PLC network 202 includes a plurality of PLC meters 203 that are communicatively linked to power line 208. The plurality of PLC meters 203 send and receive signals via power line 208 to and from PLC transceiver 206.

PLC transceiver 206 sends and receives data to and from processor 212a via local interface 250a. Processor 212a communicates via local interface 250a with memory 214a, which may include operating system 254a and application specific software 252a to process the data received and sent by PLC transceiver 206. Processor 212a may also send and receive data through primary input/output system 216a. Meter 218 may send and receive data to and from primary modem 222 via input/output sub-system 216a.

Secondary modem 224 may be an RF modem that includes RF transceiver 210 connected to antenna 220 that sends and receives data to and from RF network 204. RF transceiver 210 sends and receives data to and from processor 212b via local interface 250b. Processor 212b communicates via local interface 250b with memory 214b, which may include operating system 254b and application specific software 252b to process the data received and sent by RF transceiver 210 through primary input/output system 216b.

Processor 212b may also send and receive data through secondary input/output system 216b. Processor 212a also uses PLC transceiver 206 to transmit control signals to PLC network 202, while processor 212b may use RF transceiver 210 to transmit control signals to RF network 204. Processor 212a in primary modem 222 may control secondary modem 224 using memory 214a and application specific software 252a.

Thus, primary input/output subsystem 216a of primary modem 222, and secondary input/output subsystem 216b of secondary modem 224 may be communicatively linked to provide control information and feedback to secondary modem 224. Processor 212a may also provide an input and output of combined data to and from both primary modem 222 and secondary modem 224 and to and from meter 218 via primary input/output subsystem 216a.

The connectivity of system 200 allows user 226 to receive meter data and to control a plurality of meters in RF network 204 and PLC network 202. Alternatively, system 200 may be controlled automatically by user 226 a programmed computer processor in a remote location, such as in a central office by coupling to the AMR device 201 via a wide area network. User 226 could also be coupled to AMR device 201 via one or more RF meters and/or PLC meters 203.

Note that the example embodiment shown in FIG. 2 does not limit the composition of PLC network 202 or RF network 204. The networks may also include meters or bi-directional control/metering devices for utilities including electricity, gas, and water utilities, load control devices, and display devices.

Figure 3:
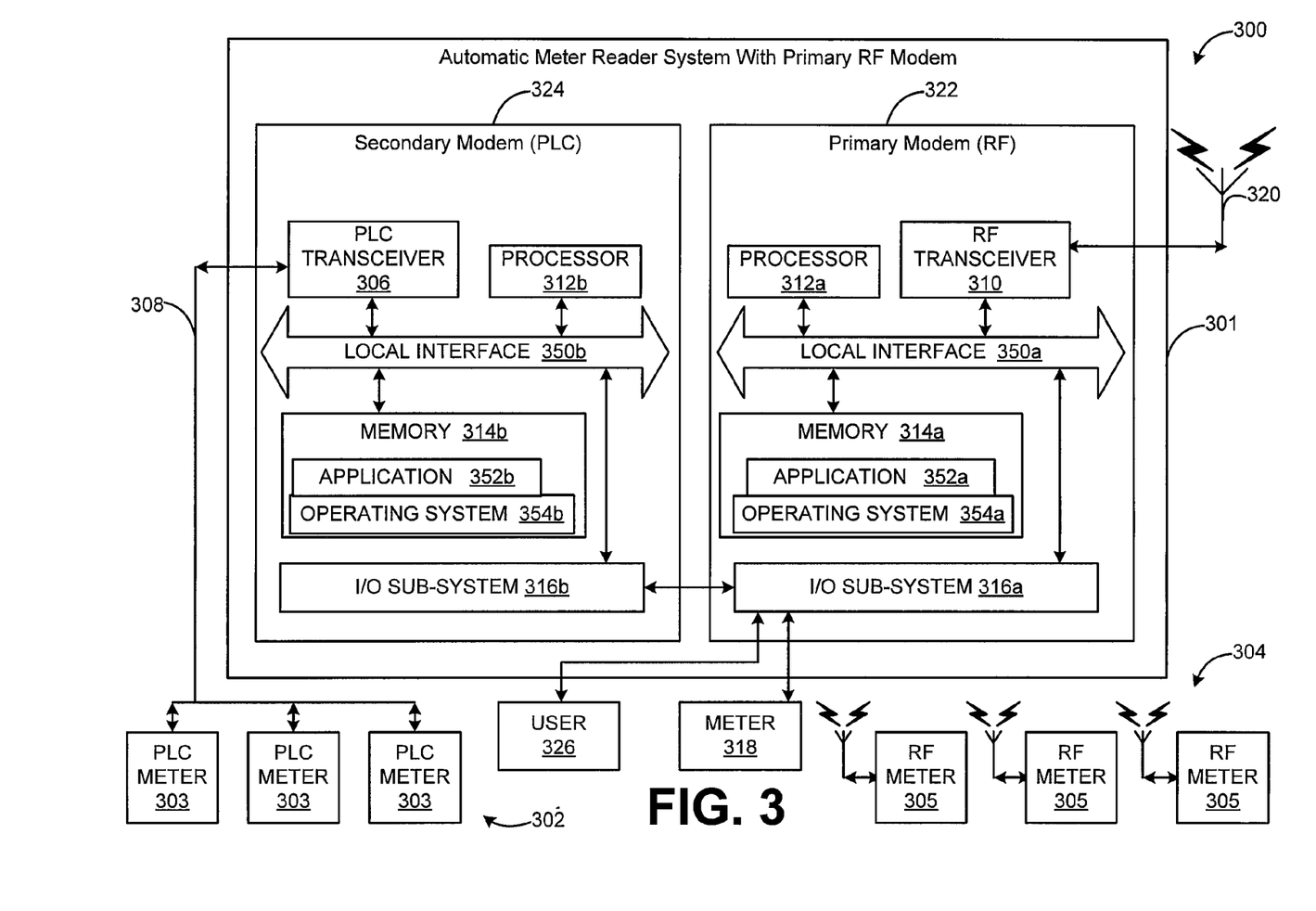
FIG. 3 provides the example embodiment AMR system of FIG. 1 with an AMR interface device having a primary RF modem and a secondary PLC modem.

FIG. 3 demonstrates an alternate but nonlimiting implementation of an AMR interface device 301, as similarly provided in FIGS. 1 and 2. AMR interface device 301 is similar to AMR interface device 201 in FIG. 2; however, in AMR interface device 301, the primary modem is RF modem 322 while the secondary modem is PLC modem 324.

AMR interface device 301 includes primary modem 322 and secondary modem 324. Primary modem 322 is an RF modem that includes RF transceiver 310 connected to antenna 320 that sends and receives data to and from RF network 304 via radio frequency. RF transceiver 310 sends and receives data to and from processor 312a via a local interface 350a. Processor 312a communicates via local interface 350a with memory 314a, which may include operating system 354a and application specific software 352a to process the data sent to and received from RF transceiver 310. Processor 312a may also send and receive data to and from meter 318 using primary input/output subsystem 316a.

Secondary modem 324 is a PLC modem that includes PLC transceiver 306, processor 312b, local interface 350b, memory 314b, and secondary input/output subsystem 316b. PLC network 302 includes a plurality of PLC meters 303 that are communicatively linked to power line 308. PLC meters 303 send and receive signals via power line 308 to and from PLC transceiver 306. PLC transceiver 306 sends and receives data to and from processor 312b via local interface 350b. Processor 312b communicates via local interface 350b with memory 314b, which may include operating system 354b and application specific software 352b to process the data sent to and received from PLC transceiver 306.

Processor 312a may also use the RF transceiver 310 to transmit control signals to RF network 304 while processor 312b may also use PLC transceiver 306 to transmit control signals to PLC network 302. Processor 312a in primary modem 322 may also control secondary modem 324 using memory 314a and application specific software 352a.

Thus, primary input/output subsystem 316a of the primary modem, and secondary input/output subsystem 316b of the secondary modem are communicatively linked to provide control information and feedback to the secondary modem. Processor 312a also provides an input and output of combined data to and from both primary modem 322 and secondary modem 324 and to and from meter 318 via primary input/output subsystem 316a. The connectivity of system 300 allows a user 326 to receive meter data and to control the meters in RF network 304 and PLC network 302. Alternatively, system 300 may be controlled automatically by user 326 with a programmed computer processor in a remote location coupled to AMR device 301 via a wide area network and/or one or more of RF meters 305 and/or PLC meters 303.

The example embodiment shown in FIG. 3 is not limited to a composition of the PLC networks or the RF networks using meters. The networks may also include meters or bi-directional control/metering devices for utilities including electricity, gas, and water utilities, load control devices, and display devices.

In an RF based AMR system, meters are occasionally placed in locations with poor RF connectivity relative to the rest of the RF network. A possible solution to this problem is to install an RF to PLC bridge device in proximity to the RF based meter. This bridge device sends and receives data and control signals to an RF meter and repeats the data and control signals to and from a PLC system.

Figure 4:
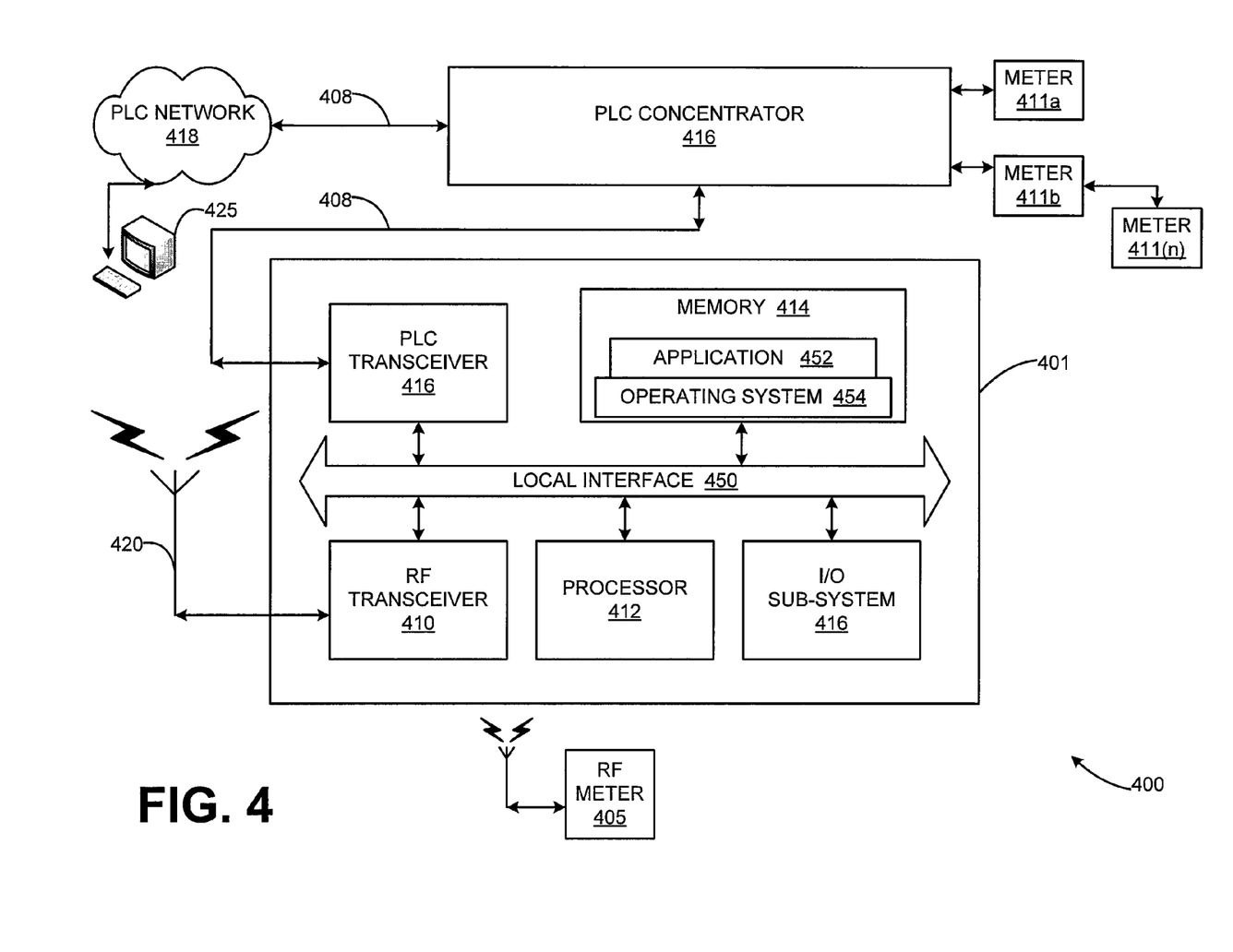
FIG. 4 provides the example embodiment AMR system of FIG. 1 with an RF to PLC bridge device.

FIG. 4 is a nonlimiting example embodiment of an RF to PLC bridge device (bridge device) 401. System 400 provides an RF meter 405 that sends and receives data via radio bridge device 401 to and from PLC concentrator 416, or another similar device that collects data from a group of meters and/or operates as a gateway with a network, such as PLC network 418, a LAN, or a WAN. PLC concentrator may also communicate with other devices in addition to bridge device 401, such as meters 411a, 411b, . . . and/or 411(n). Bridge device 401 sends and receives signals to and from RF meter 405 via antenna 420 connected to RF transceiver 410. RF transceiver 410 sends and receives data to and from processor 412 via a local interface 450. Processor 412 utilizes memory 414 which may store operating system 454 and application specific software 452 to send and receive data to and from PLC concentrator 416 via PLC transceiver 406 that is connected to power line 408.

Processor 412 also uses RF transceiver 410 and PLC transceiver 406 to transmit control signals to and from RF meter 405 and PLC network 418. PLC concentrator 416 is communicatively linked via power line 408 to PLC network 418 or a user (not shown). A user may be communicatively linked to PLC network 418 via terminal 425 or other user interface. One possible application, among others, with the RF PLC modem interconnection is to provide a PLC based AMR system with the capability of using devices that do not connect to power lines, including, but not limited to, gas meters, water meters, and load limiting devices.

Figure 5:
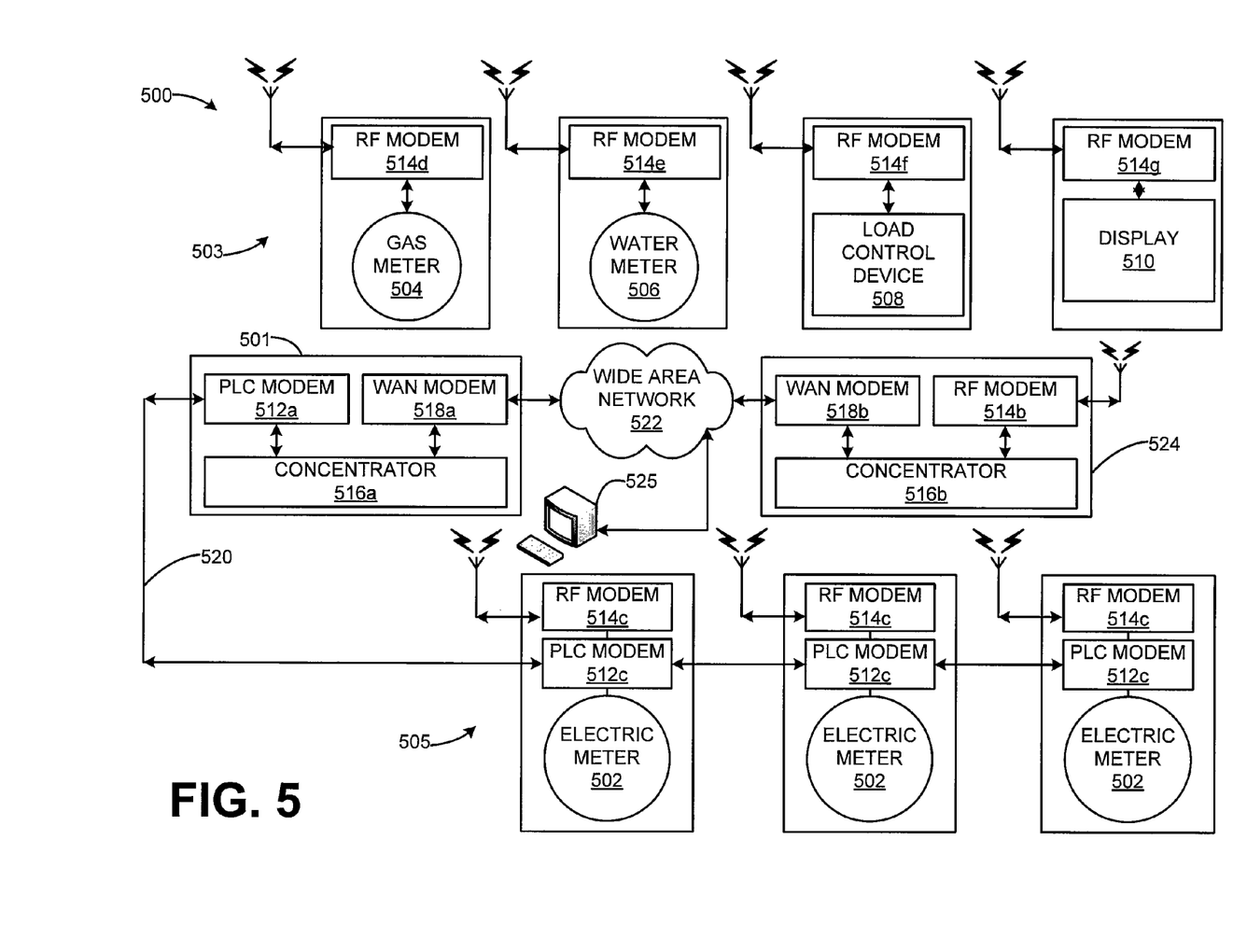
FIG. 5 provides an example embodiment system as similarly shown in FIGS. 1-4 with a number of different metering devices utilizing a PLC system or an RF system to exchange data in a serial configuration with a wide area network.

FIG. 5 provides a nonlimiting example embodiment of system 500 that includes a number of different metering devices that utilize a PLC system or an RF system to exchange data with a wide area network (WAN). Specifically, system 500 includes RF network 503, which itself may include gas meter 504 connected to RF modem 514d, water meter 506 connected to RF modem 514e, load control device 508 connected to RF modem 514f, and display device 510 connected to RF modem 514g. PLC modem 512C may act as a master modem and RF modem 514c may act as a slave modem. Alternatively, RF modem 514C may act as a master modem and PLC modem 512c may act as a slave modem. Gas meter 504, water meter 506, load control device 508, and display device 510 may exchange signals with RF modem 514b that is part of RF concentrator device 524. RF concentrator device 524 includes RF modem 514b, concentrator 516b and WAN modem 518b that is communicatively linked to WAN 522, as a nonlimiting example.

Additionally, electric meter devices 502 in PLC network 505, may communicate using PLC modems 512c via power line 520 communicatively connected in a serial configuration to PLC concentrator device 501. PLC concentrator device 501 may include PLC modem 512a, a concentrator 516a and WAN modem 518a that are communicatively linked to WAN 522. Alternatively, electric meters 502 may send and receive data through secondary RF modems 514c to WAN 522 via RF concentrator device 524. Thus, WAN 522 may receive meter readings from electric meters 502 via radio frequency or PLC.

A data center 525 may connect with RF concentrator device 524 and PLC concentrator device 501 through WAN 522. Thus, an RF based network may provide additional capabilities to a PLC based network and vice versa, as shown in FIG. 5. Additional functionality may include, among other things, power outage and power restoration messaging. RF based network 503 may also include a variety of other RF based devices including information display 510 and load control device 508. RF based load control device 508 may allow for on or off or load share command of electrical equipment, such as high volume air conditioning systems, lights, other appliances, etc.

The nonlimiting exemplary embodiment shown in FIG. 5 does not limit the composition of the PLC networks or the RF networks. The networks may also include any number of meters or bi-directional control/metering devices for utilities including electricity, gas, and water utilities, load control devices, and display devices in any logical configuration.

Figure 6:
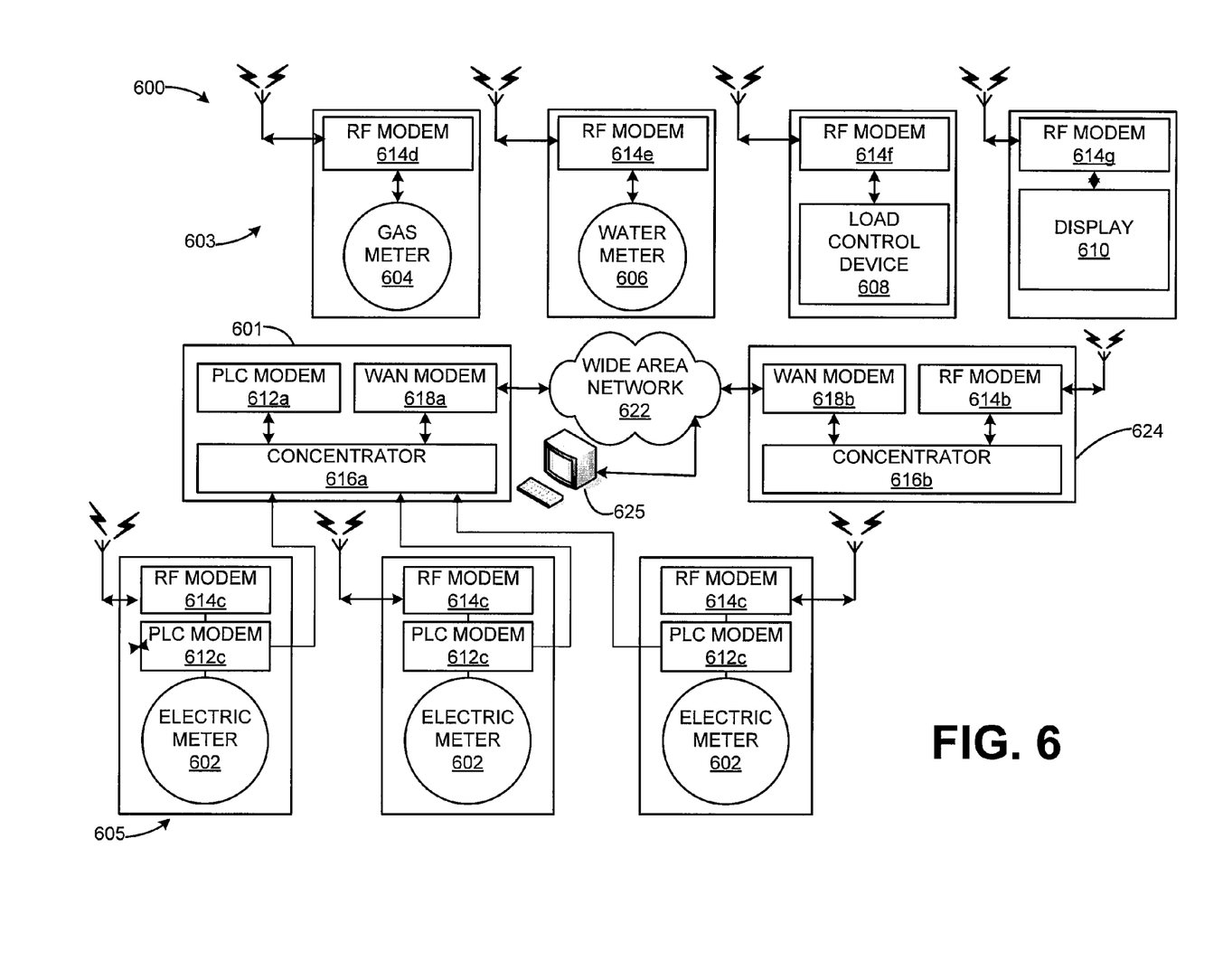
FIG. 6 provides an example embodiment system as similarly shown in FIGS. 1-4 with a number of different metering devices utilizing a PLC system or an RF system to exchange data in a parallel configuration with a wide area network.

FIG. 6 provides a nonlimiting example embodiment of system 600 that includes a number of different metering devices that utilize a PLC system or an RF system to exchange data with a wide area network (WAN). Specifically, system 600 includes RF network 603, which itself may include, gas meter 504 connected to RF modem 614d, water meter 606 connected to RF modem 614e, load control device 608 connected to RF modem 614f, and display device 610 connected to RF modem 614g. PLC modem 612c may act as a master modem and RF modem 614c may act as a slave modem. Alternatively, RF modem 614c may act as a master modem and PLC modem 612c may act as a slave modem. Gas meter 604, water meter 606, load control device 608, and display device 610 may exchange signals with RF modem 614b that is part of RF concentrator device 624. RF concentrator device 624 includes RF modem 614b, concentrator 616b and WAN modem 618b that is communicatively linked to WAN 622, as a nonlimiting example.

Additionally, electric meter devices 602 in PLC network 605, may communicate using PLC modems 612c communicatively connected in a parallel configuration to PLC concentrator device 601. PLC concentrator device 601 may include PLC modem 612a, a concentrator 616a and WAN modem 618a that are communicatively linked to WAN 622 (wide area network). Alternatively, electric meters 602 may send and receive data through secondary RF modems 614c to WAN 622 via RF concentrator device 624. Thus, WAN 622 may receive meter readings from electric meters 602 via radio frequency or PLC.

A data center 625 may connect with RF concentrator device 624 and PLC concentrator device 601 through WAN 622. Thus, an RF based network may provide additional capabilities to a PLC based network and vice versa, as shown in FIG. 6. Additional functionality may include, among other things, power outage and power restoration messaging. RF based network 603 may also include a variety of other RF based devices including information display 610 and load control device 608. RF based load control device 608 may allow for on or off or load share command of electrical equipment, such as high volume air conditioning systems, lights, other appliances, etc.

The nonlimiting exemplary embodiment shown in FIG. 6 does not limit the composition of the PLC networks or the RF networks. The networks may also include any number of meters or bi-directional control/metering devices for utilities including electricity, gas, and water utilities, load control devices, and display devices in any logical configuration.

Figure 7:
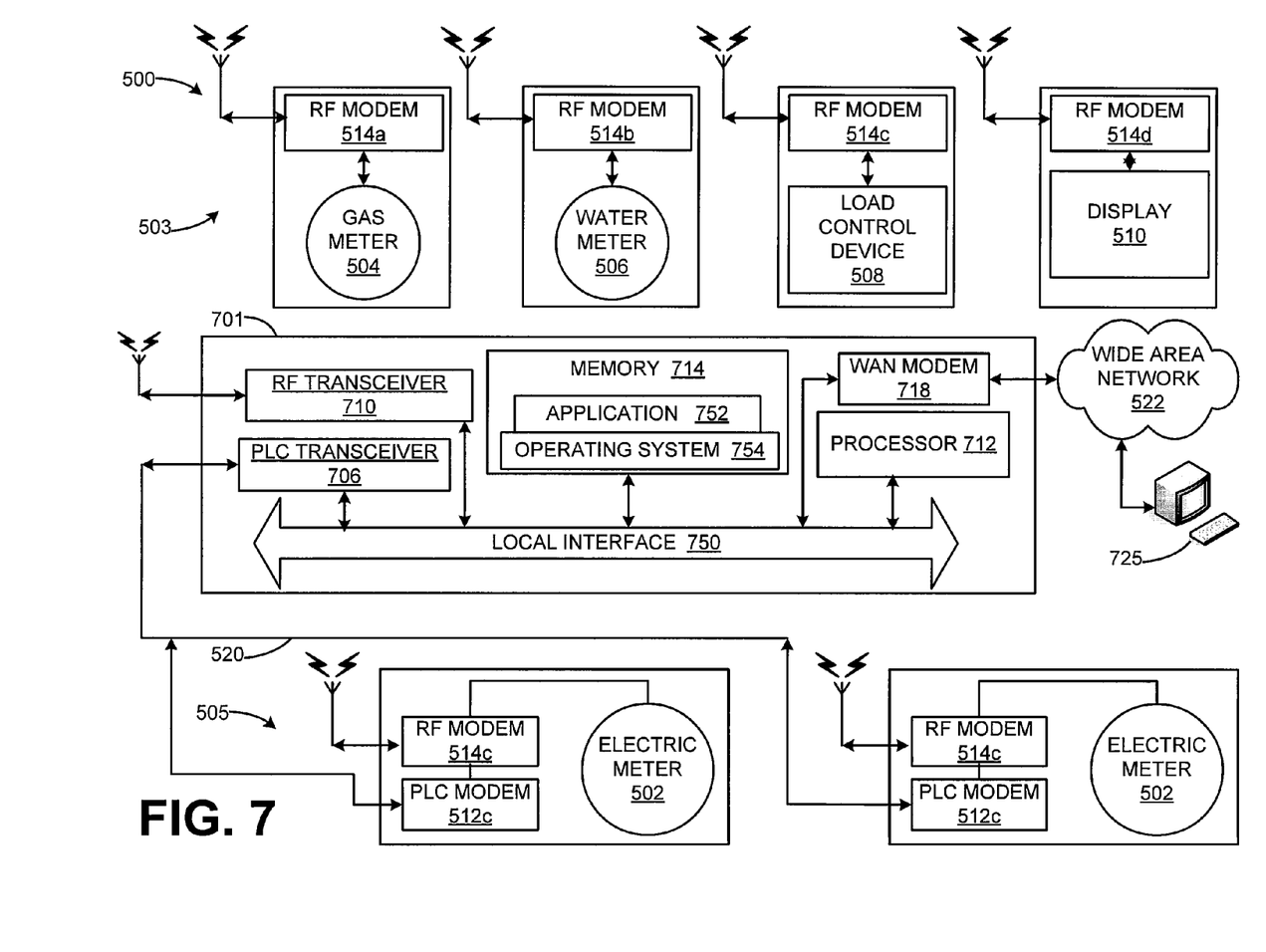
FIG. 7 provides an example embodiment system as similarly shown in FIGS. 1-6 with an RF to PLC bridge device.

FIG. 7 provides a nonlimiting example of an alternate embodiment of system 500 that includes bridge device 701. Bridge device 701 includes PLC transceiver 706 that is communicatively linked to PLC network 505 via power line 520. RF transceiver 710 is communicatively linked to RF network 503 via radio frequency. Processor 712 communicates via local interface 750 with memory 714, which may include an operating system 754 and application specific software 752 to process the data sent to and received from RF transceiver 710. Processor 712 may process data sent and received by RF transceiver 710 and PLC transceiver 706 and send the data to WAN 522 via WAN modem 718. A user may be communicatively linked to the system 500 from data center 725, as similarly discussed above.

Figure 8:
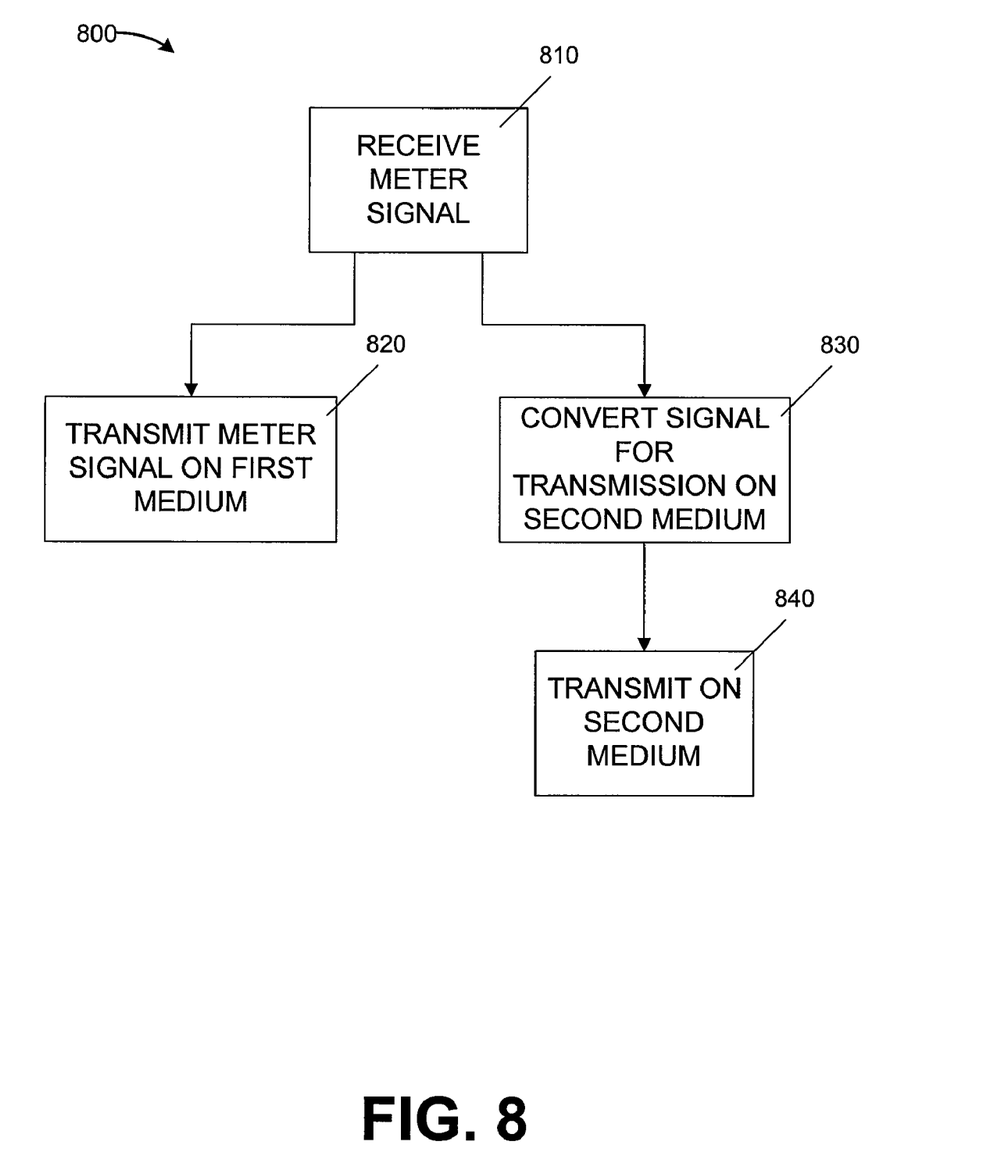
FIG. 8 provides a flow chart of an exemplary embodiment of an AMR method.

FIG. 8 provides a flow diagram of method for automatic meter reading communication 800. In block 810 a meter signal is received by a first transceiver. In block 820, the transceiver transmits the meter signal on a first medium, such as a nonlimiting example of a radio frequency. However, if the transceiver is out of range of its transmission capability, in block 830, the meter signal is converted for transmission by a second transceiver on a second medium, such as a nonlimiting example of a PLC. The conversion may be performed by the first transceiver, the second transceiver or some other conversion device communicatively coupled between the first and second transceiver. In block 840, the meter signal is transmitted on the second medium.

The embodiments described herein do not limit the type of wireless or wired communication system that may be used to exchange information in the networks. These communication systems may include but are not limited to satellite communications, wireless internet communications, cellular telephone communications, radio frequency communications, fiber optic networks, and cable television networks among others.

Embodiments of the present disclosure may be implemented in hardware, software, firmware, or a combination thereof. In the example embodiment(s), the method for automatic meter reading communication is implemented in software or firmware that is stored in a memory and that is executed by a suitable instruction execution system. If implemented in hardware, as in an alternative embodiment, the method for automatic meter reading communication may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The flow chart of FIG. 8 shows the architecture, functionality, and operation of a possible implementation of a software implementation. In this regard, each block represents a module, segment, or portion of code, which comprises one or more executable instructions for implementing the specified logical function(s). It should also be noted that in some alternative implementations, the functions noted in the blocks may occur out of the order noted in FIG. 8 For example, two blocks shown in succession in FIG. 8 may in fact be executed substantially concurrently or the blocks may sometimes be executed in the reverse order, depending upon the functionality involved.

The method for automatic meter reading communication program, which comprises an ordered listing of executable instructions for implementing logical functions, may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a "computer-readable medium" may be any means that may contain, store, communicate, propagate, or transport the program for use by or in connection with the instruction execution system, apparatus, or device. The computer readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program may be electronically captured, via for instance optical scanning of the paper or other medium, then compiled, interpreted or otherwise processed in a suitable manner if necessary, and then stored in a computer memory. In addition, the scope of the present disclosure includes embodying the functionality of the preferred embodiments of the present disclosure in logic embodied in hardware or software-configured mediums.

It should be emphasized that the above-described embodiments of the present disclosure are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

We claim:

1. An automatic meter reading device, comprising:
    a first transceiver communicatively coupled to a first meter via an electricity line and configured to receive and transmit signals containing data over the electricity line;
    a second transceiver communicatively coupled to the first transceiver and wirelessly coupled to a second meter, the second transceiver configured to wirelessly receive signals containing data from the second meter and to wirelessly transmit signals containing data to the second meter;
    a memory communicatively coupled to the first and second transceivers;
    a processor configured to receive signals containing data from one of the first or second transceivers and to convert the signals containing data for transmission by the other of the first or second transceivers; and
    an interface coupled to a wide area network for communication with a processing device also coupled to the wide area network.

2. The device of claim 1, wherein the first transceiver is a PLC transceiver that receives signals containing electricity meter data from an electricity meter coupled by an electricity line, and the second transceiver is a radio frequency (RF) transceiver that wirelessly transmits signals containing the electricity meter data to a meter having an RF transceiver.

3. The device of claim 1, wherein the first transceiver is a radio frequency (RF) transceiver that receives wirelessly signals containing electricity meter data from a meter having an RF transceiver, and the second transceiver is a PLC transceiver that transmits signals containing the electricity meter data to an electricity meter coupled by an electricity line.

* * * * *